United States Patent [19]

Thome et al.

[11] Patent Number: 5,100,853

[45] Date of Patent: Mar. 31, 1992

[54] MOLDED ALUMINOSILICATE CATALYST AND METHOD FOR ITS PREPARATION

[75] Inventors: Roland Thome; Arno Tissler, both of Bonn, Fed. Rep. of Germany

[73] Assignee: Vereinigte-Aluminium-Werke AG, Bonn, Fed. Rep. of Germany

[21] Appl. No.: 538,993

[22] Filed: Jun. 15, 1990

[30] Foreign Application Priority Data

Jun. 20, 1989 [DE] Fed. Rep. of Germany ....... 3920048

[51] Int. Cl.$^5$ .............................................. B01J 29/28
[52] U.S. Cl. ........................................ 502/64; 502/71
[58] Field of Search ............................. 502/60, 64, 71

[56] References Cited

U.S. PATENT DOCUMENTS

| | | | |
|---|---|---|---|
| 3,356,450 | 12/1967 | Heinze | 502/60 |
| 3,368,981 | 2/1968 | Plank et al. | 502/64 |
| 3,640,903 | 2/1972 | Hilfman | 502/64 |
| 3,764,563 | 10/1973 | Minachev et al. | 502/64 |
| 4,507,396 | 3/1985 | Hickson . | |

FOREIGN PATENT DOCUMENTS

| | | | |
|---|---|---|---|
| 0167324 | 8/1986 | European Pat. Off. . | |
| 0231133 | 5/1987 | European Pat. Off. . | |
| 26922 | 2/1984 | Japan | 502/64 |
| 137313 | 8/1984 | Japan | 502/64 |
| WO88/08329 | 11/1988 | PCT Int'l Appl. . | |

Primary Examiner—Carl F. Dees
Attorney, Agent, or Firm—Darby & Darby

[57] ABSTRACT

Disclosed is a molded aluminosilicate catalyst, including a zeolite powder and a $SiO_2$-containing powder. The $SiO_2$-containing powder includes $SiO_2$ particles of from about 0.1 to about 5 microns in average diameter. The aluminosilicate catalyst includes from about 5 to about 70 percent by weight of the $SiO_2$-containing powder.

15 Claims, 1 Drawing Sheet

MOLDED ALUMINOSILICATE CATALYST AND METHOD FOR ITS PREPARATION

FIELD OF THE INVENTION

The present invention relates to a molded aluminosilicate catalyst, including a zeolite powder and optional additives in the form of binders and lubricants, as well as to a method for its preparation.

BACKGROUND OF THE INVENTION

In the preparation of molded aluminosilicates to form stable extrudates, granulates or moldings, useful as catalysts in chemical and petrochemical processes and as adsorbents in gas-purifying or separation processes, aluminum-containing binders or additives are frequently used. The extrudates, granulates or moldings, may be used in such processes as dewaxing, alkylation of aromatics, oligomerization of lower olefins, cracking, converting alcohols to fuels, and the like. However, this method does not work when molding high-silica or low alumina zeolites with special catalytic properties, e.g. very high stability, hydrophobicity, and shape selectivity (the combination of the molecular sieve effect and acid heterogeneous catalysis), such as found with zeolites of the pentasil group. Pentasils are a family of high-silica zeolites having ten-membered rings, which show largely five-ring building units in their structures. One well known type of pentasil is ZSM-5 (Zeolite Socony 5, tradename of Mobil Oil Corporation).

According to European Patent 0 102 544 (BASF), a silicic acid ester, such as tetramethyl orthosilicate is proposed as a binder or additive for fracture-resistant zeolite catalysts of the pentasil group. The strengthening action of this additive is based on a chemical reaction with the zeolite powder and therefore requires that the material used be matched accurately. Consequently, this method requires careful monitoring of the reaction to ensure that the proper amount of additive is present. Accordingly, the resultant molded pentasil zeolite is expensive and time-consuming to manufacture.

It is therefore desirable to provide a pentasil group zeolite catalyst which may be easily molded, extruded or granulated, easily and inexpensively, and which has high strength and abrasion resistance, and is highly fracture-resistant.

OBJECTS OF THE INVENTION

It is an object of the present invention to provide a binder or lubricant for the preparation of fracture-resistant aluminosilicate objects, which is usable for a wide range of zeolites and can be mixed in a simple preparation method with the zeolite powder.

DETAILED DESCRIPTION OF THE INVENTION

Figure 1:
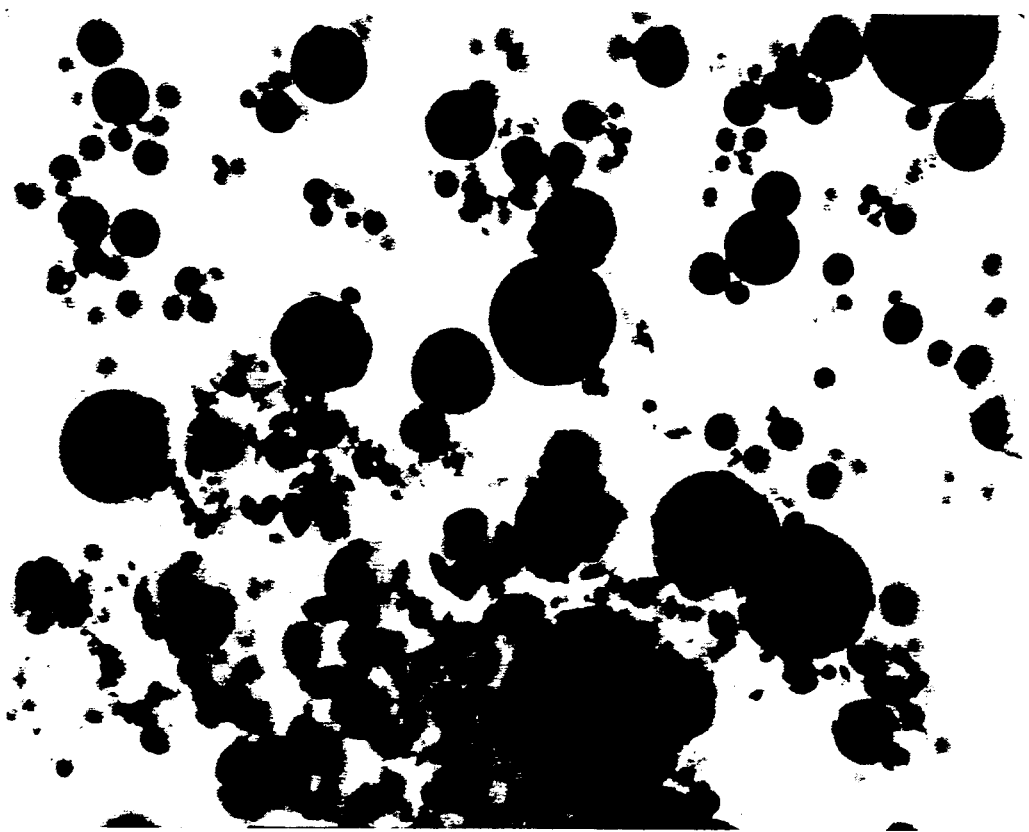

It has been ascertained by the present inventors that the $SiO_2$ off-gas dust obtained from the extraction of silicon according to many silico-thermic processes, such as the production of ferro silica, having a particular range of particle sizes decisively improves the rheological properties of the zeolite powder during molding and, at the same time, increases the strength of the extrudates, build-up granulates and molded granulates without adversely affecting the catalytic properties of the pentasil zeolites. The shape selectivity of the starting powder is maintained or improved further even when, pursuant to the invention, large amounts of $SiO_2$ off-gas dust are added to the zeolite material (see Examples 1 to 3).

The abrasion resistance and fracture resistance of the molded material of the present invention can be controlled by the amount of $SiO_2$ off-gas dust added, by the degree of deagglomeration of the zeolite powder, by the pressing pressure for the extrusion granulates, molded granulates and build-up granulates and by the solids content of the zeolite suspensions during fluidized bed spray granulation.

Additional lubricants and binders usually added to the molding of powders, such as methylcelluloses, polyvinyl alcohols and stamping or punching oils do not have any significant effect on the final strength of catalysts or catalyst supports activated at the high temperatures needed to form molded pentasil zeolite catalysts, generally about 400° to 700° C. The function of these additives is limited essentially to binding to the zeolite powder to "green compositions", which can be compressed or granulated. This function is increasingly lost at temperatures above 300° C. Even the lubricating function of conventional additives is inadequate for zeolite molding.

The low friction ("sliding") properties of the "green compositions" are improved significantly by spherical particles of $SiO_2$ off-gas dust, the diameters of the particles of which lie in the range of about 0.1 to 5 microns.

The special range of particle sizes of the $SiO_2$ powder useful in the present invention, was determined with a laser granulometer of the Cilas-715 type (Malvern-Mastersizer, Malvern Instruments, Inc., U.S.A.). The theoretical or true density was measured using a helium pycnometer. For the determination of the BET (specific surface area) of the $SiO_2$ particles by the method of DIN 66 132, 1975 edition, a Stroehlein area meter (Stroehlein, Dusseldorf, West Germany) and the following pretreatment was used. The samples were dried by being heated to 110° C. for 24 hours. The samples were then flushed with nitrogen and alternately evacuated at one-half hour intervals, until the samples were completely desorbed. FIG. 1 shows a TEM photograph (Transmission Electron Micro scope) with a 63,000-fold magnification. The roundish-spherical particles, which correspond to the special spectrum of particle sizes of claim 9, can be seen clearly.

Esters of silicic acid and silica sols cannot be used in the alkaline pH region as binders and lubricants. On the other hand, the $SiO_2$ off-gas dust is fully operative in this pH range. This opens up the possibility of molding the powders in the sodium form, obtained during zeolite synthesis in an alkali-medium, such as NaOH. This greatly simplifies the preparation of zeolite catalysts and makes it more economic. To be used as catalysts, the sodium form of the zeolite must be exchanged with e.g., ammonia salts or mineral acids.

Surprisingly, it has been ascertained by the present inventors that sodium zeolite extrudates and granulates from sodium zeolite powders in the uncomminuted as well as in the comminuted state, which were prepared, for example, with 30% $SiO_2$ off-gas dust, have an excellent strength after being activated at 550° C. and can be subjected without problems to an ion exchange with, for example, an ammonium nitrate solution without a significant reduction in the strength of the extrudate.

The invention is further explained by the following examples:

EXAMPLE 1 a) Sodium pentasil zeolite powder produced by VAW AG, West Germany, with an average particle diameter of 6 microns, was mixed with 2.6% Tylose MHB 30,000 (Hoechst AG, Frankfort, West Germany) and 2.7% stamping or punching oil (Voitlander, Kronach, Bavaria, West Germany) on the total amount of material, to an extrudable granulate, with the required amount of water and extrusion molded to form extrudates (5 cm long, with a diameter of 0.5 cm). After activation at 550° C., the strength was 2.3 N/mm$^2$ (measured using a May-Tec 4 point bending measurement, Gailingen, West Germany).

b) For comparison, the same sodium pentasil zeolite powder was mixed with 30% SiO$_2$ off-gas dust (VAW AG, Bonn, West Germany) 2.5% Tylose MHB 30,000 and 2.7% punching or stamping oil to an extrudable granulate with the required amount of water and extrusion molded to extrudates (5 cm long, with a diameter of 0.5 cm. After activation at 550° C., the strength was 7.5 N/mm$^2$.

EXAMPLE 2

H-pentasil zeolite powder, with an average particle diameter of 6.5 microns, was mixed 2.5% Tylose MHB 30,000 and 2.6% stamping or punching oil, based on the total amount of material, to an extrudable granulate, with the required amount of water and extrusion molded to extrudates (5 cm long, with a diameter of 0.5 cm). After activation at 550° C., the strength was 0.3 N/mm$^2$.

The catalytic form selectivity for the disproportioning of ethylbenzene (by the Karge method; Karge, H. G., et al, I. *Catal.*, 82:236-39 (1983)) produced the following results:

89.7% paradimethylbenzene
10.3% metadimethylbenzene
0% orthodimethylbenzene

For comparison, the same H-pentasil zeolite powder was mixed with 30% SiO$_2$ off-gas dust, 2.5% Tylose MHB 30,000 and 2.6% punching or stamping oil to an extrudable granulate with the required amount of water and extrusion molded to extrudates (5 cm long, with a diameter of 0.5 cm). After activation at 550° C., the strength was 3.6 N/mm$^2$.

The catalytic form selectivity for the disproportioning of ethylbenzene (by the Karge method) produced the following results:

92.7% paradimethylbenzene
7.3% metadimethylbenzene
0% orthodimethylbenzene

EXAMPLE 3 a) H-pentasil zeolite powder, with a d$_{50}$ (average diameter) of approximately 6 microns, was mixed with 2% Tylose MH 50 (Hoechst AG, Frankfort, West Germany), 1% Moviol (polyvinylalcohol) and the required amount of water and granulated with the help of a fluidized bed spray granulator (Buchl 190, Flawil, Switzerland). The granulate (with a diameter of 3 mm), activated at 500° C., was subjected to the abrasion test set forth below in Table 1.

The results are compared with those from samples b) and c) in Table 1.

b) For comparison, 30% SiO$_2$ off-gas dust was added to the mixture a) under otherwise the same conditions. The results of the abrasion test of the granulate, activated at 500° C., are given in Table 1.

c) As a further variation of (a) and (b), the H-pentasil zeolite powder used there was de-agglomerated to a d$_{50}$ of approximately 3 microns, mixed with 30% SiO$_2$ off-gas dust and Moviol as under (a) and (b) and subjected to the fluidized bed spray granulation. After being activated at 500° C., the granulates were subjected to the abrasion test.

The results clearly show the reinforcing action of the SiO$_2$ off-gas dust (b). This effect is improved significantly further by de-agglomeration of the zeolite powder (c).

The shape selectivity remains the same in all 3 experiments.

TABLE 1

Determination of the Abrasion on pentasil zeolite Granulates - 3 mm Diameter

| Granulate | Abrasion, % less than 2.5 mm Time (minutes) in the Turbula Drum Mixer | |
|---|---|---|
| | 1' | 3' |
| a) Zeolite power (d$_{50}$ ca. 12 microns) | 17 | 31 |
| b) Zeolite powder (d$_{50}$ ca. 12 microns) + 30% SiO$_2$ off-gas dust | 8 | 18 |
| c) Zeolite powder (d$_{50}$ ca. 3 microns) + 30% SiO$_2$ off-gas dust | 1 | 2 |

Abrasion Test

Granulate (10 g) was treated in a 250 mL PVC bottle with the addition of 100 g of aluminum oxide grinding balls (having a diameter of 5 to 10 microns) in the Turbula drum mixer for several minutes.

What is claimed is:

1. Molded aluminosilicate catalyst, comprising pentasil zeolite powder and a SiO$_2$ off-gas dust including SiO$_2$ particles of from about 0.1 to about 5 microns in average diameter, and said aluminosilcate catalyst including from about 5 to about 70 percent by weight of said SiO$_2$ off-gas dust.

2. The molded aluminosilicate catalyst of claim 1, wherein said SiO$_2$ off-gas dust includes from about 15 to 35 percent by weight of the total weight of the aluminosilicate.

3. The molded aluminosilicate of claim 1, wherein said SiO$_2$ off-gas dust is combined with said zeolite powder in an alkaline medium.

4. The molded aluminosilicate of claim 1, wherein said SiO$_2$ off-gas dust is combined with said zeolite powder in an acidic medium.

5. The molded aluminosilicate of claim 1, wherein the average particle size of the of aluminosilicate powder is from about 1 to 6 microns.

6. The molded aluminosilicate catalyst of claim 1, wherein said SiO$_2$ off-gas dust has the following composition:

| | |
|---|---|
| SiO$_2$ | 86–98% |
| SiC | 0.1–1.0% |
| K$_2$O | 0.2–3.5% |
| Al$_2$O$_3$ | 0.1–0.5% |
| MgO | 0.2–3.5% |
| SO$_4{}^{2-}$ | 0.1–0.4% |
| Na$_2$O | 0.1–1.8% |
| CaO | 0.05–0.3% |

-continued

| | |
|---|---|
| $Fe_2O_3$ | 0.01–1%. |

7. The molded aluminosilicate catalyst of claim 1, wherein said $SiO_2$ off-gas dust has a theoretical density of 2.2 g/m³.

8. The molded aluminosilicate catalyst of claim 1, wherein said $SiO_2$ off-gas dust has a specific surface area of from about 20 to about 22 m²/g.

9. The molded aluminosilicate catalyst of claim 1, wherein said $SiO_2$ off-gas dust has the following range of grain sizes:

| | |
|---|---|
| Secondary Particles: | >1 micron 30% |
| | >10 microns 5% |
| Primary Particles: | 0.1 to 0.3 microns. |

10. The molded aluminosilicate catalyst of claim 1, wherein the particles of said $SiO_2$ off-gas dust are substantially spherical.

11. The molded aluminosilicate catalyst of claim 1, wherein said $SiO_2$ off-gas dust from the manufacture of silicon.

12. The molded aluminosilicate catalyst of claim 1, wherein said catalyst includes a binder.

13. The molded aluminosilicate catalyst of claim 1, wherein said catalyst includes a lubricant.

14. A method for the preparation of molded aluminosilicate catalyst, comprising the steps of:
  mixing a pentasil zeolite powder with 5 to 70% by weight based on the amount of aluminosilicate catalyst of a $SiO_2$ off-gas dust, including particles having an average particle size of from about 0.1 to 5 microns;
  processing the mixture into molded material; and
  subsequently activating the aluminosilicate catalyst.

15. The method according to claim 14, wherein said $SiO_2$ off-gas dust from the production of ferrosilicon, said $SiO_2$ off-gas dust added in an amount of from about 15 to 35%, based on the amount of aluminosilicate in the mixture.

* * * * *